United States Patent [19]

Peterson

[11] Patent Number: 5,216,286
[45] Date of Patent: Jun. 1, 1993

[54] UNINTERRUPTED POWER CONDITIONER CIRCUIT

[75] Inventor: Brent C. Peterson, Cedar Rapids, Iowa

[73] Assignee: Rockwell International Corporation, Seal Beach, Calif.

[21] Appl. No.: 715,520

[22] Filed: Jun. 14, 1991

[51] Int. Cl.⁵ .............................................. H02J 9/00
[52] U.S. Cl. ...................... 307/64; 323/271
[58] Field of Search .................. 307/43, 64, 66, 72, 307/82, 83, 84; 361/111, 118; 323/269, 272, 268, 271

[56] References Cited

U.S. PATENT DOCUMENTS

| | | | |
|---|---|---|---|
| 3,873,846 | 3/1975 | Morio et al. | 307/66 |
| 4,010,381 | 3/1977 | Fickenscher et al. | 307/66 |
| 4,528,459 | 7/1985 | Wiegel | 307/66 |
| 4,535,282 | 8/1985 | Nguyen | 323/269 |
| 4,558,230 | 12/1985 | Western | 307/66 |
| 4,628,433 | 12/1988 | Notohamiprodjo | 323/272 |
| 4,638,175 | 1/1987 | Bradford et al. | 307/64 |

Primary Examiner—Jeffrey A. Gaffin
Attorney, Agent, or Firm—G. Brian Pingel; Gregory G. Williams; H. Fredrick Hamann

[57] ABSTRACT

A conditioning circuit for providing a reliable source of supply power has a source of interruptible power, a source of uninterruptible power, a first voltage limiting circuit supplied with power from the interruptible source, a normally off second voltage limiting circuit supplied with power from the uninterruptible source and a monitoring circuit for detecting interruptions in the power supplied by the interruptible source and triggering the second limiting circuit to an on condition. An adjustable timing circuit is associated with the monitoring circuit to control the on condition of the second limiting circuit to restrict its on condition to a predetermined desired period.

10 Claims, 2 Drawing Sheets

UNINTERRUPTED POWER CONDITIONER CIRCUIT

BACKGROUND OF THE INVENTION

1. Field of the Invention

The present invention relates in general to uninterruptible power supplies for critical equipment, and more specifically relates to a conditioning circuit operating from multiple redundant power sources that is preferably utilized to provide uninterrupted power to a power supply for control of aircraft display and control systems.

2. Description of the Prior Art

Advanced system technology utilized in modern aircraft requires reliable and tightly regulated power supply voltages. However, aircraft power distribution frequently contains voltage spikes and surges, brown-outs, and black-outs due to power bus transfer switching and various environmental conditions. Nevertheless, to maintain proper operation, power interruptions must be eliminated and the power supplied to the aircraft display system circuitry must be free from variations and glitches which might otherwise cause serious functional breakdowns in the operation of the equipment.

To provide power supplies useable with the critical equipment of aircraft systems, means have long been adopted to supply such power supplies with back-up features to improve their reliability. One such back-up feature is the utilization of energy storage circuitry sufficient to operate through short duration power interrupts. Another means for avoiding power supply interruptions, is the use of designs which operate from redundant d.c. input sources, each of which independently develops the output power that is required. These independently developed sources of power can then be utilized to insure that power is provided to a load without interruption. An example of one such prior art system is disclosed in U.S. Pat. No. 4,558,230. A power supply is disclosed in such patent that utilizes a dual source and power converter whereby either source and power converter is capable of powering the load upon failure of the other source or power converter and where the sources and power converters share the load if both sources are operative.

The uninterruptible conditioning circuit of the present invention differs from the prior art in that it is not a regulating power supply, but rather a special power conditioning circuit alternatively connecting a 28 volt primary source of power or a 24 volt battery source of power to a d.c. to d.c. converter such as a power supply. In this way, short duration interruptions of input power to the d.c. to d.c. converter are avoided through the use of a circuit design that is highly reliable, but is relatively simplistic in terms of components.

SUMMARY OF THE INVENTION

The present invention resides in an uninterruptible conditioning circuit that provides a reliable source of supply power for use in circuitry powering advanced systems found in modern aircraft to provide reliable and tightly regulated power supply voltages. Although the present invention is not designed to eliminate relatively long term power interruptions, the short term interruptions avoided by the present invention constitute over 95 percent of the interruptions experienced on aircraft power distribution systems.

In a preferred form of the invention two sources of d.c. aircraft power are utilized, with each source connected to a voltage limiting means. Output power from one of the two voltage limiting means is normally supplied to a monitoring means for detecting interruptions in such power and for triggering the other of said voltage limiting means to an on condition to compensate for said power interruption.

An adjustable timing means is employed to control the on condition of the other of said voltage limiting means to restrict its on condition to a predetermined period as desired. It is also preferable to include a retrigger mask means that prevents the monitoring means from retriggering the other of said voltage limiting means to an on condition more than once during any specific power interruption.

The foregoing and other features and advantages of the invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DETAILED DESCRIPTION OF THE PREFERRED EMBODIMENT

Figure 1:
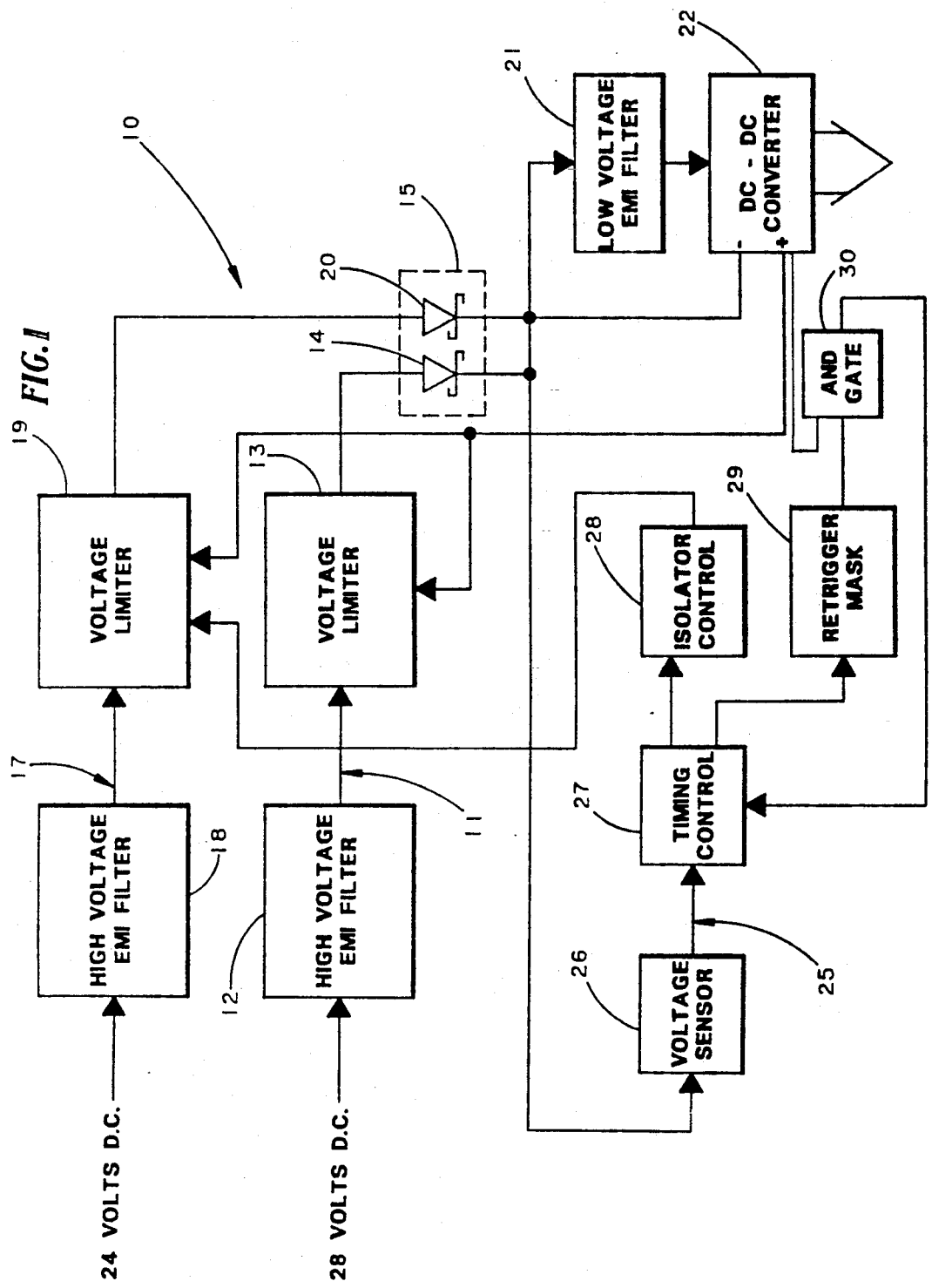
FIG. 1 is a block diagram of a preferred embodiment of a conditioning circuit of the present invention.

Referring now to the drawings and with specific reference first to FIG. 1, a presently preferred embodiment of the present invention is shown generally in the form of a power conditioning circuit 10 that is adapted for alternatively connecting a source of primary d.c. power or a source of battery d.c. power to a d.c. to d.c. converter during short term power interruptions. The circuit 10 is adapted to be advantageously used in supplying uninterrupted power to critical equipment such as the flight control or display systems of an aircraft.

The circuit 10 includes a branch 11 of a primary source of 28 volt d.c. comprised of an electromagnetic interference (EMI) filter 12, a voltage limiter 13, and a first diode 14 of a dual Schottky diode 15. The circuit 10 also includes a second power branch 17 from a battery source of 24 volt d.c. comprised of a second EMI filter 18, a second voltage limiter 19 and a second diode 20 of the dual Schottky diode 15.

The outputs of the voltage limiters 13 and 19 are alternatively provided to the Schottky diodes 14 and 20 and a low voltage EMI filter 21 and then to a d.c. to d.c. converter 22 such as a power supply known in the art for use with aircraft systems. To control the operation of the branches 11 or 17 for maintaining an uninterrupted flow of power to the EMI filter 21, the circuit 10 includes a low voltage sensing and timing branch 25 that incorporates a voltage sensor 26, a timing control 27, an optically coupled isolator control 28, a retrigger mask 29 and an AND gate 30.

In operation, the 28-volt d.c. is applied to the high voltage EMI filter 12 that serves to attenuate both incoming and exiting radio frequency interference and thereby insures electromagnetic compatibility among the various systems operating off the 28 volt source of power. With reference now to both FIGS. 1 and 2, the filters 12 and 18 are of standard construction known in the art and are formed respectively of inductors 33 and 34, 120 volt transient suppression diodes 35 and 36, parallel capacitors 37, 38 and 39, 40, and inductors 41 and 42.

The output of the filter 12 is fed to the voltage limiter 13 that is utilized for surge conditions when the input voltage rises above 45 volts. The voltage limited output of the limiter 13 is then supplied through the Schottky diode 14 to the low voltage EMI filter 21 and then to the d.c. to d.c. converter 22. Due to the use of the diodes 35 and 36 short duration voltage spikes present on the power inputs are clamped so as not to exceed 150 volts. Consequently, this permits the use of low voltage capacitors for the capacitors 37-40 to provide higher capacitance per unit volume and a greater attenuation of electromagnetic interference, and also permits the use of lower voltage components in the voltage limiters 13 and 19.

The voltage limiter 13 includes an RC timing path with a resistor 46 and a capacitor 47 so that as voltage is applied to the limiter 13, the capacitor 47 is charged through the resistor 46 until the gate to source threshold voltage of a MOS field effect transistor 48 is reached and it begins conducting. The limiter 13 further includes a 45 volt zener diode 49 to limit the voltage applied to subsequent stages of the circuit 10. This limiting action begins as the input voltage of the limiter 13 rises above 40 volts because the diode 49 allows only a 5 volt gate to source voltage which forces the operation of the transistor 48 into the linear region. Thus, during any voltage surge, the difference between the applied voltage to the limiter 13 and 45 volts appears across the drain to source terminals of the transistor 48 so that the output voltage of limiter 13 will not exceed 45 volts.

The voltage limiter 13 includes an 18 volt zener diode 50 that limits input control voltage to the transistor 48 and protects against the possibility of gate to source breakdown of such transistor. Preferably, the value of the resistor 46 is high so that a gradual charging of the capacitor 47 occurs, which provides a gradual increase in gate to source voltage to the transistor 48 and thereby results in a well controlled turn-on characteristic thereof. Such controlled turn-on of the transistor 48 provides an inrush current limiting as the drain current of the transistor 48 begins flowing through the Schottky diode 14 such that initial input current upon power application will not exceed four times the average steady state input current. Such controlled inrush current allows the use of volumetrically efficient solid tantalum capacitors with high reliability and efficiency and long life as part of the low voltage EMI filter 21.

The output current from the diode 14 charges energy storage capacitors 53-56, that together with inductors 57 and 58 form the low voltage EMI filter 21 which serves as a low impedance voltage source for the d.c. to d.c. converter 22 and shields the converter 22 from adverse radiated fields and conducted ground loop effects. Preferably, the d.c. to d.c. converter includes circuitry to provide various 15 volt and 5 volt bias voltages required by the circuit 10. Upon the supply of power to the converter 22, the 15 volt isolated voltage forward biases a switching diode 59 and results in current flow through a resistor 60 to provide the necessary gate to source voltage to saturate the transistor 48.

So long as no power interruption occurs in the circuit branch 11, the operation of the circuit 10 will continue in the aforementioned described manner. However, when the output voltage of the primary power source circuit branch 11 decreases to 17.5 volts or less, the voltage sensor 26 supplies a falling edge trigger to the timing control 27.

The voltage sensor 26 includes a comparator 61 and a voltage dividing network formed of resistors 62-64 and capacitors 65 and 66. When the threshold point of 17.5 volts or less is supplied to such voltage dividing network, the comparator 61 provides a triggering signal to the B input of a monostable multivibrator 67 that primarily comprises the timing control 27. Upon receipt of such triggering signal, the multivibrator 67 supplies a pulse of a desired width to the isolator control 28, which in turn triggers the voltage limiter 19.

During normal operation, the voltage limiter 19 is maintained in an off condition. However, upon receipt of isolated control voltage output from the isolator control 28, the voltage limiter 19 supplies output voltage to the Schottky diode 20 to compensate for interruptions of power through the circuit branch 11. The details of this operation are as follows.

Activation of the multivibrator 67 produces a positive pulse at the Q output that enables switching to the battery supply power branch 17 by forward biasing the base to emitter junction of a transistor 68 through a resistor 69. This action saturates the transistor 68 and forward biases the emitter portion of an optically coupled isolator 70 that together with the transistor 68 principally form the isolator control 28. A resistor 71 is chosen of such value that the optically coupled isolator 70 is saturated to divert the base current of a transistor 72 and thereby turn such transistor to an off condition.

Normally the transistor 72 is held on in a fully saturated condition due to base current flowing through a resistor 73, but such base current is diverted by actuation of the isolator 70. With transistor 72 turned off, capacitor 74 begin charging due to current flow through a resistor 75, which biases a MOS field effect transistor 76 in the limiter 19, into an on condition to provide current flow through the diode 20 to replenish the charge on the capacitors of filter 21. As such current flows, an 18 volt zener diode 77 limits the input control voltage to the transistor 76, in similar fashion to that of the zener diode 50, and a 45 volt zener diode 78 serves an identical function to that of the zener diode 49 in the limiter 13.

The transistor 76 remains in an on condition for the duration of the pulse width provided at the Q output of the multivibrator 67. Such pulse width is determined by a timing circuit formed of a resistor 81 and capacitor 82. The duration of the pulse from the timing control 27 is variable, but to have minimal effect on battery discharge it is preferable that the pulse be approximately 240 ms. At such duration, it has been determined that the bridging effect of the present invention will eliminate in excess of 95 percent of power interrupts encountered on the primary voltage source circuit branch 11.

To further limit the amount of battery discharge caused by the circuit 10, a triggering pulse is provided by the timing control 27 to the retrigger mask 29. In turn, the retrigger mask 29 supplies an output through the AND gate 30 to the timing control 27 to prevent such control from being retriggered immediately following a 240 ms period during which the branch 17 is supplying power to the EMI filter 21 and the d.c. to d.c.

converter 22. In this way, the circuit 10 will not continue to switch to the battery source during power interruptions of extended durations.

Figure 2:
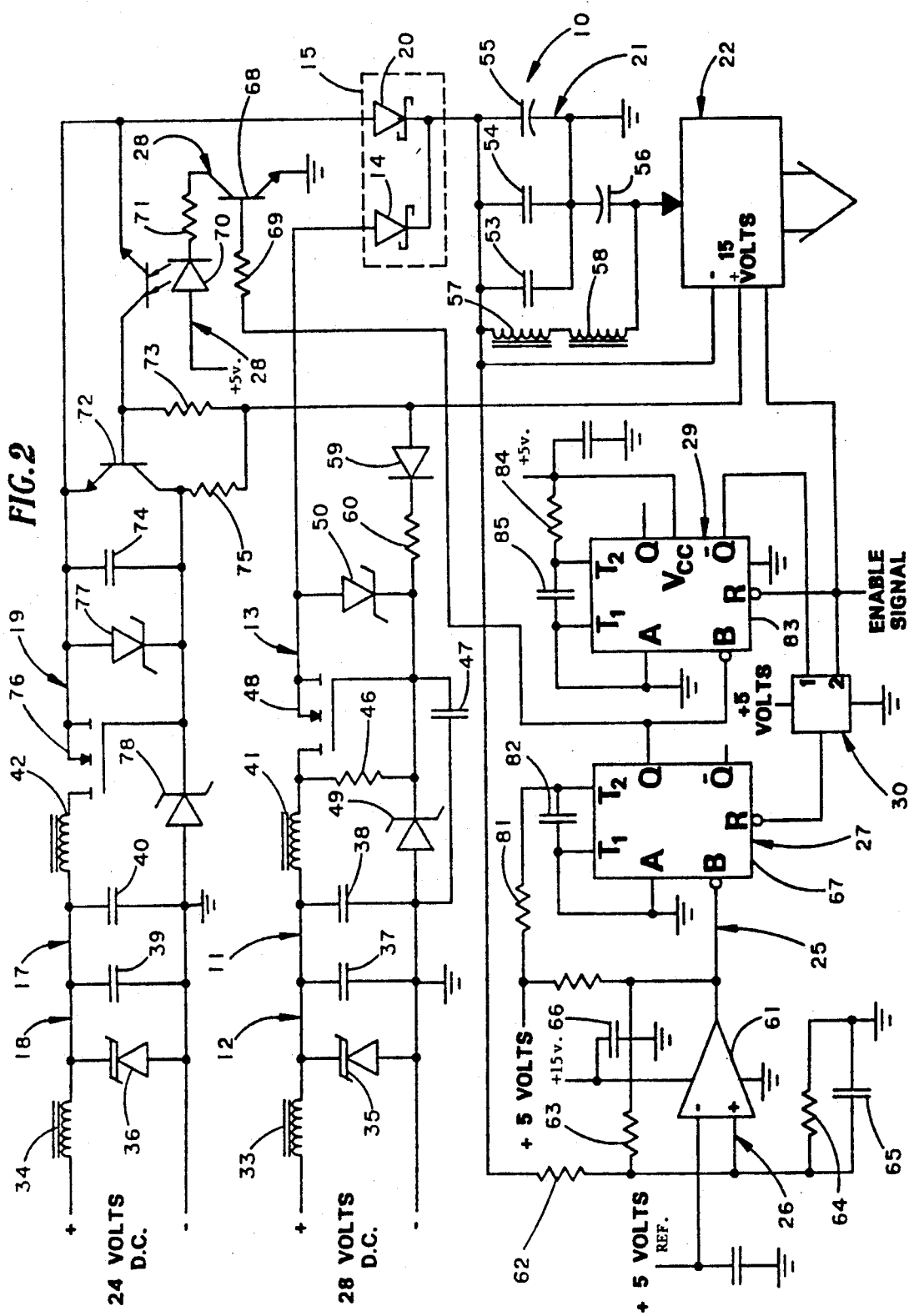
FIG. 2 is a schematic diagram of the preferred embodiment of the invention of FIG. 1.

The specific operation of the retrigger mask 29 is as follows. At the end of the Q output pulse of the multivibrator 67, a falling edge trigger is applied to the B input of a second monostable multivibrator 83. As a result, a low blanking pulse is provided at the Q output of the multivibrator 83 to the multivibrator 67 via the AND gate 30. The blanking pulse from the multivibrator 83 is applied to terminal 1 of the AND gate 30. As shown in FIG. 2, the AND gate 30 is also provided with an enable signal to its terminal 2. When power is first applied to the circuit 10, the enable signal is low and serves to maintain the converter 22 in an off condition and also resets both multivibrators 67 and 83. Upon a sufficient level of primary voltage being provided to the circuit 10, the enable signal switches to high and the converter 22 begins operating.

With a high enable signal on terminal 2 of the AND gate 30 and a low signal on its terminal 1 from the multivibrator 83, a low blanking pulse is provided to the multivibrator 67 to reset the same and prevent it from being retriggered. The duration of the blanking pulse provided by the multivibrator 83 is controlled by a resistor 84 and capacitor 85, and only has to be sufficient to permit capacitor 56 of the EMI filter 21 to discharge below a predetermined low voltage (preferably 15 volts). At such a low voltage level the converter 22 is adapted to shut down and thereby set the enable signal low to prevent inadvertent retriggering from the voltage sensing and timing branch 25. In this way, when there is an interruption in primary power, battery source power is provided for a relatively short period of time to prevent interruptions in the d.c. to d.c. converter input voltage; if primary power does not return during such period, the circuit 10 will shut down so that the battery will not be significantly discharged.

The present invention thus provides a reliable and efficient conditioning circuit to eliminate short term interruptions in primary power and allows for a controlled transition to operation from a battery power source when the primary power falls below a predetermined level. By such switching, all power interrupts typically defined as "short" become completely transparent, which allows for a substantial reduction in the complexity of circuitry associated with power interrupt handling and provides uninterrupted performance with only minimal increase in required battery capacity.

The input power switchover is implemented by the use of the low forward voltage drop isolating Schottky diodes 14 and 20 which prevent the possibility of backfeeding electrical signals to either d.c. power source and have a low power consumption to make the circuit 10 highly efficient. Furthermore, the dual Schottky diode 15, which provides an OR-ing function to combine input currents from both primary and battery power sources, is located in the circuit 10 so as to be extremely well protected from adverse environmental affects to achieve a high degree of reliability. Accordingly, the circuit 10 exhibits an ideal interface between an aircraft power system and a d.c. to d.c. converter, while requiring a relatively low parts count to maintain the high level of reliability required in advanced avionics systems.

Although the present invention has been described with respect to a particular embodiment thereof, it is not to be so limited as changes might be made therein which fall within the scope of the invention as defined by the appended claims.

I claim:

1. A system for providing a reliable source of supply power, said system comprising:
    (a) a source of interruptible electrical power;
    (b) a source of uninterruptible electrical power;
    (c) a normally on first voltage limiting means having an N channel MOSFET supplied with power from said interruptible source;
    (d) a normally off second voltage limiting means having an N channel MOSFET supplied with power from said uninterruptible source and having an output operatively connected to the output of said first voltage limiting means; and
    (e) monitoring and timing means for detecting interruptions in the power supplied by said interruptible source and triggering said second limiting means to an on condition for a predetermined desired period.

2. A system as recited in claim 1 wherein said circuit further comprises a retrigger mask means that controls the number of times said monitoring and timing means can trigger said second limiting means during any particular interruption in the power supplied by said interruptible source.

3. A system as recited in claim 1 wherein the outputs of said first and second limiting means are supplied to a pair of low forward voltage drop OR-ing diodes that prevent the backfeeding of electrical signals to either d.c. source.

4. A system as recited in claim 1 wherein said circuit further includes a control means that isolates the monitoring and timing means from said second limiting means.

5. A system as recited in claim 1 wherein said circuit further comprises filter means located between each source of power and its respective limiting means to attenuate incoming and exiting radio frequency interference in said circuit.

6. A system as recited in claim 5 wherein each of said filter means includes a high voltage transient suppression means for clamping short duration voltage spikes supplied from said sources of power.

7. A system for providing a source of uninterrupted power to a power supply for control of aircraft display and control systems, said circuit comprising:
    (a) a first branch of interruptible power having:
        (1) high voltage filtering means for attenuating incoming and exiting radio frequency interference in said circuit; and
        (2) a voltage limiting means having a first N channel MOSFET, that provides an output voltage that does not exceed a desired maximum;
    (b) a second branch of uninterruptible power that is normally in an off condition and has:
        (1) high voltage filtering means for attenuating incoming and exiting radio frequency interference in said circuit; and
        (2) a voltage limiting means having a second N channel MOSFET, that provides an output voltage that does not exceed a desired maximum;
    (c) gate means that is connected to the output of said first and second branches and alternatively provides an output corresponding to the output of said first or second branches, said gate means including a low forward voltage drop dual common cathode schottky diode;

(d) monitoring and timing means for detecting interruptions in the power supplied by said interruptible source and triggering said second branch to an on condition for a predetermined desired period to provide output power to said gate means; and (e) low voltage filtering means that receives the output from said gate means and serves as a low impedance voltage source for said power supply and shields such supply from adverse radiated fields.

8. A system as recited in claim 7 wherein said circuit further comprises a retrigger mask means that controls the number of times said monitoring and timing means can trigger said second branch during any particular interruption in the power supplied by said first branch.

9. A system as recited in claim 7 wherein said circuit further includes a control means that isolates the monitoring and timing means from said second branch.

10. A system as recited in claim 7 wherein each of said voltage limiting means has an inrush current that is not greater than four times the average steady state input current of said limiting means and thereby permits the use of volumetrically efficient components in said low voltage filtering means.

* * * * *